(12) United States Patent
Westoby

(10) Patent No.: US 9,157,173 B2
(45) Date of Patent: Oct. 13, 2015

(54) PROCESS OF MAKING A WOVEN FABRIC FOR VEHICLE AIRBAGS

(75) Inventor: Scott Westoby, Brockworth (GB)

(73) Assignee: INVISTA North America S.a.r.l., Wilmington, DE (US)

( * ) Notice: Subject to any disclaimer, the term of this patent is extended or adjusted under 35 U.S.C. 154(b) by 705 days.

(21) Appl. No.: 13/393,910

(22) PCT Filed: Jul. 31, 2009

(86) PCT No.: PCT/GB2009/001899
§ 371 (c)(1),
(2), (4) Date: Mar. 2, 2012

(87) PCT Pub. No.: WO2010/015809
PCT Pub. Date: Feb. 11, 2010

(65) Prior Publication Data
US 2012/0205901 A1   Aug. 16, 2012

Related U.S. Application Data

(60) Provisional application No. 61/086,820, filed on Aug. 7, 2008.

(51) Int. Cl.
| | | |
|---|---|---|
| *D01D 5/42* | (2006.01) | |
| *D02J 1/22* | (2006.01) | |
| *D03D 15/00* | (2006.01) | |
| *B29C 47/00* | (2006.01) | |
| *D02G 3/44* | (2006.01) | |
| *D03D 1/02* | (2006.01) | |
| *D03D 13/00* | (2006.01) | |

(52) U.S. Cl.
CPC ............ *D03D 15/00* (2013.01); *B29C 47/0057* (2013.01); *B29C 47/0066* (2013.01); *D01D 5/423* (2013.01); *D01D 5/426* (2013.01); *D02G 3/446* (2013.01); *D03D 1/02* (2013.01); *D03D 13/008* (2013.01); *D03D 15/0088* (2013.01); *D10B 2331/02* (2013.01); *D10B 2401/041* (2013.01); *D10B 2401/062* (2013.01); *D10B 2401/063* (2013.01); *D10B 2505/124* (2013.01); *Y10T 442/2008* (2015.04)

(58) Field of Classification Search
CPC .. B29C 47/0057; B29C 47/0066; D01D 5/42; D01D 5/423; D01D 5/426; D02G 3/446; D02J 1/22; D03D 1/02; D10B 2505/124
USPC .......... 264/103, 129, 147, 160, 210.1, 210.2, 264/210.8, 288.4, 290.5, 290.7
See application file for complete search history.

(56) References Cited

U.S. PATENT DOCUMENTS

| | | | |
|---|---|---|---|
| 2,071,250 A | | 2/1937 | Carothers |
| 2,071,251 A | | 2/1937 | Carothers |
| 2,130,523 A | | 9/1938 | Carothers |
| 2,130,948 A | | 9/1938 | Carothers |
| 2,241,322 A | | 5/1941 | Hanford |
| 2,312,966 A | | 3/1943 | Hanford |
| 2,512,606 A | | 6/1950 | Bolton et al. |
| 3,393,210 A | | 7/1968 | Speck |
| 3,918,501 A | | 11/1975 | Wolstencroft |
| 4,477,407 A | | 10/1984 | Hetherington et al. |
| 5,071,699 A | * | 12/1991 | Pappas et al. .................. 442/110 |
| 5,482,317 A | * | 1/1996 | Nelsen et al. ............... 280/743.1 |
| 5,508,073 A | | 4/1996 | Krummheuer |
| 5,746,446 A | | 5/1998 | Breed et al. |
| 5,759,462 A | * | 6/1998 | Jordan ...................... 264/103 X |
| 5,782,489 A | | 7/1998 | LaLonde et al. |
| 5,863,063 A | | 1/1999 | Harrell |
| 5,881,776 A | | 3/1999 | Beasley, Jr. |
| 6,022,817 A | * | 2/2000 | Lewis et al. ................... 442/189 |
| 6,149,194 A | | 11/2000 | Breed et al. |
| 6,367,513 B1 | | 4/2002 | Cain |
| 6,539,983 B2 | | 4/2003 | Khokar |
| 6,632,753 B1 | | 10/2003 | Beasley, Jr. |
| 6,803,333 B2 | | 10/2004 | Brown et al. |
| 7,259,113 B2 | | 8/2007 | Dufresne-Nappert et al. |
| 7,267,884 B2 | | 9/2007 | Chou et al. |
| 2001/0005660 A1 | * | 6/2001 | Li et al. .......................... 442/71 |
| 2004/0198126 A1 | | 10/2004 | Kunisada et al. |
| 2004/0242103 A1 | | 12/2004 | Loos |
| 2006/0166577 A1 | | 7/2006 | Rashed |
| 2006/0192373 A1 | * | 8/2006 | Manley ...................... 280/743.1 |
| 2006/0284403 A1 | | 12/2006 | Hill |
| 2007/0031621 A1 | | 2/2007 | Morimoto et al. |
| 2007/0065614 A1 | | 3/2007 | Schulthess |
| 2007/0278775 A1 | | 12/2007 | Ting et al. |

FOREIGN PATENT DOCUMENTS

| | | |
|---|---|---|
| EP | 1908580 | 4/2008 |
| WO | WO99/14082 | 3/1999 |
| WO | WO2006/075962 | 7/2006 |

* cited by examiner

*Primary Examiner* — Leo B Tentoni
(74) *Attorney, Agent, or Firm* — Joseph N. Moonjely

(57) ABSTRACT

Disclosed herein is the preparation of woven fabrics suitable for use in manufacturing vehicle airbags. Such fabrics are woven from a plurality of polymeric, e.g., polyamide, warp and weft tapes which have preferably been slitted, preferably in the machine direction, from a thermoplastic polymer film, and preferably from such a film which has been drawn at least in the machine direction. The resulting fabrics exhibit both the relatively low basis weight, stiffness and small packing volume typical of nylon films, and the relatively high tear strength and high damage tolerance of yarn-based woven airbag fabrics.

14 Claims, No Drawings

PROCESS OF MAKING A WOVEN FABRIC FOR VEHICLE AIRBAGS

FIELD OF THE INVENTION

This invention relates to the preparation of fabrics suitable for use in the manufacture of airbags. Such fabrics are prepared by weaving together a plurality of drawn polymer tapes in both the warp and weft directions. These polyamide tapes are prepared from polymer, e.g., polyamide, films including films which have been drawn in at least the machine direction.

BACKGROUND OF THE INVENTION

Within the passenger compartment of a vehicle, many occupant restraint systems can be utilized, such as seatbelts and air bag systems. For instance, air bag systems can supplement the protection offered by seatbelts. Air bag systems typically comprise at least one folded air bag and means for providing an inflation gas. The air bag system is designed to inflate the air bag with the inflation gas when a collision between the vehicle and another object is detected.

Usually, air bags are made of a woven fabric to provide strength to the air bag, so that the air bag can withstand the force of an inflation gas quickly inflating the air bag. In addition, some air bags are coated with a composition that can increase or alter the strength, heat resistance, and/or air permeability characteristics of the air bag.

Airbags as supplementary restraint devices for passengers in vehicles have, for example, historically been produced from woven fabrics formed from warp and weft fibers or yarns. The warp and weft fibers or yarns used to form such woven airbags have typically been predominantly nylon 6,6 with filament counts between 34 to 250. Airbag fabrics, including coated fabrics, woven from yarns, including flat yarns, have been described, for example, in U.S. Pat. Nos. 5,508,073; 5,881,776; 6,632,753; and 6,803,333, and in U.S. Published Patent Application Nos. 2006/0284403 and 2007/0031621.

Airbags have also been manufactured using a continuous film of, for example, polyamide or polyurethane. Life Hightech Co Ltd, for instance, markets airbags based on polyurethane films. Using a film for airbags offers the possibility of weight reduction and eliminates the process steps of weaving and finishing. However, the disadvantage of using a continuous film is generally the relatively low resistance to tear propagation exhibited by films. For this reason, designs for film-based airbags frequently employ a tear resistant reinforcing element in combination with the continuous film. Such reinforced film airbags are disclosed, for example, in U.S. Pat. Nos. 5,746,446 and 6,149,194 and in U.S. Published Patent Application Nos. 2006/0192373, 2007/0065614 and 2007/0278775.

Notwithstanding the availability of airbags fashioned from both fabrics and reinforced films, it would be advantageous to provide new substrate materials for airbag construction which impart to airbags made therefrom a combination of desirable properties and characteristics. In particular, such new substrate materials would desirably provide the benefits of using a film, namely the potential for low thickness and high strength, while also providing the benefits of a woven structure, namely high tear strength and good damage tolerance.

In addition to the functional demands of airbag cushions, there are also increasing demands on vehicle manufacturers to reduce the weight and volume of airbag modules. Use of smaller and lighter airbags in airbag modules allows space in the vehicle for other functionalities. Smaller and lighter airbag modules would also potentially reduce the overall vehicle weight, thereby leading to increased fuel efficiency and reduction in $CO_2$ output of the vehicle.

SUMMARY OF THE INVENTION

In one aspect, the present invention is directed to a woven fabric suitable for use in manufacturing vehicle airbags, and to airbags made therefrom. Such a fabric is one which is woven from a plurality of thermoplastic polymer, e.g., polyamide, warp tapes and a plurality of thermoplastic polymer, e.g., polyamide, weft tapes. Both the warp tapes and the weft tapes can be prepared by either slitting in the machine direction an at least machine direction-drawn polymeric, e.g., polyamide, film; or by slitting an undrawn or partially MD-drawn polymeric film and by then machine-direction drawing or further drawing the resulting tapes. Both warp and weft tapes have a width of from about 3 mm to about 15 mm and a tensile strength of at least about 200 MPa. The resulting fabric woven from these tapes has a basis weight of from about 40 grams/m$^2$ to about 140 grams/m$^2$. Such fabrics preferably exhibit a grab tensile strength of at least about 1000 Newtons and a warp tongue tear strength of at least about 200 Newtons.

In another aspect, the present invention is directed to a process for preparing a woven fabric suitable for use in manufacturing vehicle airbags. In the first step of such a process, a thermoplastic polymer, e.g., polyamide, film is provided. Such a film has a machine direction and a caliper of from about 80 to about 240 microns. In a second process step, this polymer film is drawn at least in the machine direction at a draw ratio of from about 2 to about 6. In a third process step, this machine direction drawn film is slitted in the machine direction to form a plurality of thermoplastic polymer, e.g., polyamide, tapes, each having a width of from about 3 mm to about 15 mm and a tensile strength of at least about 200 MPa. In a fourth process step, these polymer tapes are utilized as both warp and weft tapes to weave a fabric therefrom. Such a fabric has a basis weight of from about 40 grams/m$^2$ to about 140 grams/m$^2$.

In yet another aspect, the present invention is directed to a process for preparing a woven fabric suitable for use in manufacturing vehicle airbags. In the first step of such a process, a thermoplastic polymer, e.g., polyamide, film is provided. Such a film has a machine direction and a caliper of from about 80 to about 240 microns. In a second process step, this polymer film is slitted, for example, in the machine direction, to form a plurality of thermoplastic polymer, e.g., polyamide, tapes, each having a machine direction and a width of from about 3 mm to about 15 mm. In a third process step, these tapes are drawn in the machine direction, preferably at a draw ratio of from about 2 to about 6, to provide tapes each having a tensile strength of at least about 200 MPa. In a fourth process step, these drawn polymer tapes are utilized as both warp and weft tapes to weave a fabric therefrom. Such a fabric has a basis weight of from about 40 grams/m$^2$ to about 140 grams/m$^2$.

DETAILED DESCRIPTION OF THE INVENTION

The fabrics used to make airbags in accordance with the present invention are woven from drawn polymer tapes made from thermoplastic polymeric films. The thermoplastic materials used to form such films, and the tapes prepared from them, are orientable, normally solid, generally crystalline polymers and copolymers. Typical examples of such polymeric materials include polyolefins such as high density polyethylene, polypropylene, poly-1-butene and poly-4-methyl- 1-pentene; polyesters such as polyethylene terephthalate (PET) and polybutylene terephthalate (PBT); and polyamides such as the nylons. Suitable polymeric materials for use in forming the films, tapes and fabrics herein include polyamides.

Polyamides useful herein can include those semi-crystalline and amorphous resins having a number average molecular weight of at least 5000, a melting point of 350° C. or less, and are commonly referred to as nylons. Suitable polyamides include those described in U.S. Pat. Nos. 2,071,250; 2,071,251; 2,130,523; 2,130,948; 2,241,322; 2,312,966; 2,512,606; and 3,393,210, incorporated herein by reference.

The polyamide resin useful for making the film can be produced, for example, by condensation of equimolar amounts of an aliphatic or aromatic dicarboxylic acid containing from 4 to 12 carbon atoms with a diamine, in which the diamine contains from 4 to 14 carbon atoms. Excess diamine can be employed to provide an excess of amine end groups over carboxyl end groups in the polyamide. Polyamides are thus typically derived by the polymerization of one or more saturated dibasic acids such as, for example, oxalic acid, succinic acid, adipic acid, suberic acid, sebacic acid, etc., with one or more saturated diamines such as, for example, hydrazine, ethylene diamine, tetramethylene diamine, pentamethylene diamine, hexamethylene diamine, decamethylene diamine. Polyamides can also be made by the polymerization of one or more monoamino-monocarboxylic acids, or the cyclic lactams thereof, such as, for example, 6-aminohexanoic acid, 11-aminoundecanoic acid, 12-aminostearic acid and the like; or by the interpolymerization of a mixture of one or more diamines, one or more dicarboxylic acids and one or more monoamino-monocarboxylic acids. The preferred polyamides for use in making the films from which the polyamide tapes herein can be prepared include polycaprolactam (nylon-6), polyhexamethylene adipamide (nylon-6,6), polytetramethylene adipamide (nylon-4,6), polyhexamethylene sebacamide (nylon-6,10), polyaminoundecanoic acid (nylon-11), polyamino-dodecanoic acid (nylon-12), and mixtures thereof.

The polyamide films useful for making tapes in the present invention can also comprise polyamide resins in combination with other polymeric materials such as ethylene-based copolymers. Such ethylene based copolymers can include, for example, ethylene/vinyl acetate and ethylene/alkyl (meth) acrylate dipolymers and terpolymers. Modified polyamides of this type are disclosed in U.S. Pat. No. 7,267,884, incorporated herein by reference.

The polymeric films useful in this invention can also include multi-component films which have additional components to impart useful functionality thereto. Such additional components include, but are not limited to, those which provide improved thermal resistance, improved thermal bondability and/or reduced flammability to the films used herein. One especially useful type of additive comprises copper-containing compounds or complexes which can serve as anti-oxidants and heat stabilizers.

The films from which the polymeric tapes herein are made can be formed by conventional means such as by casting, by extrusion coating onto fabric or extrusion onto rollers, or by blowing. Cast or blown films are preferred. The films so produced will generally have a caliper (gauge) of from about 3.15 mils to about 9.45 mils (80 to 240 microns), more preferably from about 3.94 to about 5.91 mils (100 to 150 microns), prior to being drawn. The films used to form the tapes herein may be single layer films or multilayer films. Useful polymer films for preparation of the polymeric tapes used to form the airbag fabrics herein are commercially available. One suitable type of nylon 6,6 polyamide film for use herein is marketed under the tradename Dartek® by DuPont Canada.

In one embodiment, a polymer film to be used herein will generally be drawn in at least the machine direction to provide an oriented film. The film can typically be machine direction drawn using a draw ratio of from about 2 to about 6, more preferably drawn using a draw ratio of from about 3 to about 5. For purposes of this invention, the "draw ratio" refers to the final machine direction dimension of the film brought about by drawing divided by the original machine direction dimension of the film prior to drawing.

In the embodiment herein wherein the film is drawn prior to being slit into tapes, such films may be either uniaxially or biaxially drawn so long as the film has at least been drawn in the machine direction. Conventionally when films are used for airbag construction, they must be drawn biaxially in both the machine and transverse (cross) directions in order to have sufficient tensile strength for air bag use. However, by using a drawn polymer film herein for the preparation of tapes for subsequent weaving into fabric, the film needs only be drawn in the machine direction, thereby simplifying preparation of the film for eventual slitting to produce the requisite polymeric tapes. Accordingly, in the instance wherein the films herein are drawn prior to slitting, the films used herein can be uniaxially drawn in the machine direction.

Procedures for uniaxially orienting polymer films by drawing are well known. One conventional procedure for the preparation of uniaxially, e.g., machine direction, oriented nylon films is disclosed, for example, in U.S. Pat. No. 4,477,407, incorporated herein by reference.

Once formed or otherwise provided, and possibly drawn to a desired extent, the polymer films as hereinbefore described can be slitted in the machine direction to provide a plurality of polymeric tapes for eventual use in weaving the airbag fabrics herein. The slit film tapes can be produced with a slitting apparatus that comprises a support frame; a plurality of substantially planar cutting blades; a mounting structure for mounting the cutting blades to the support frame; and a feed roll attached to the support frame. Each of the cutting blades includes cutting edges and opposed ends. The mounting structure can be configured to mount the cutting blades in substantially aligned, parallel and spaced apart relationship, wherein the blades can be mounted such that each blade has one of its cutting edges exposed for cutting, and wherein the cutting edges of adjacent blades are spaced apart from each other. The feed roll can be configured to feed film in a downstream direction over the exposed cutting edges of the blades. Preparation of, for example, polyamide tapes by slitting drawn polyamide films in this manner is described in the hereinbefore-referenced U.S. Pat. No. 7,267,884.

The polymeric tapes prepared by slitting the polymer film will generally range in width from about 3 mm to about 15 mm, more preferably from about 4 mm to about 10 mm. Tapes of this width can be drawn if needed and wound onto bobbins so that they are available for eventual use as both warp and weft tapes for weaving of the airbag fabrics herein.

If the polymer film from which the tapes are slit has not been drawn or only partially drawn prior to slitting, it will generally be necessary to draw or further draw the individual tapes after they have been slit from the polymer film. Such drawing or further drawing of the tapes will generally be carried out to the extent necessary to provide tapes of the requisite tensile strength to be woven into the airbag fabrics herein. Thus for purposes of this invention, a film is considered to be "partially drawn" if it has been drawn to some extent but not to an extent such that warp and weft tapes slit therefrom will have the requisite tensile strength without being "further drawn".

For tapes slit from undrawn, non-oriented films, draw ratios of from about 2 to about 6, for example, from about 3 to about 5, can be used. Again, for purposes of this invention, the "draw ratio" in this instance refers to the final machine direction length of the tape brought about by drawing divided by the original machine direction length of the tape prior to drawing.

For tapes slit from films which have been partially drawn in the machine direction, "further drawing" of the tapes will generally be needed to provide tapes of the requisite tensile strength. In this instance, a total draw ratio (film draw ratio plus tape draw ratio) of from about 2 to about 6 should be used. Both warp and weft tapes, whether slit from a drawn film, drawn after being slit from the film, or both, should have a tensile strength of at least about 200 MPa, more preferably at least about 300 MPa.

The polymeric tapes as hereinbefore described are used as both warp and weft tapes in the preparation of a fabric woven from such tapes. Weaving of the tapes into fabric can be carried out using any suitable weaving loom, typically a projectile type loom or a Rapier loom, although other loom types may also be used. Any suitable weave pattern can be used, for example, a plain weave or a twill weave. Whatever the weave pattern, the fabrics herein will generally comprise a plurality of warp tapes in a substantially parallel side-by-side relationship and a plurality of weft tapes also in a substantially parallel side-by-side relationship. Processes and apparatus for weaving various types of thermoplastic tapes into various type of fabrics, scrims or other woven material are described in U.S. Pat. Nos. 3,918,501; 6,367,513; 6,539,983 and 7,259,113; in U.S. Published Patent Application No. 2006/0166577 and in PCT Patent Application No. WO 2006/075962. All of these patent publications are incorporated herein by reference.

To improve the productivity in weaving of the slit film or to impart enhanced properties to particular areas of the woven slit film (such as for example to provide enhanced thermal reinforcement to certain areas), a woven slit film fabric can comprise slit film tapes of more than one thickness or slit film tapes of more than one width in the warp, weft or both warp and weft directions. Thus, warp and/or weft slit film tapes of varying thicknesses and widths may be used within the same piece of slit film woven fabric.

Use of polymeric tapes made from slit film provides several advantages in the weaving process compared to conventional airbag fabric weaving processes which employ multifilament yarns. The nature of the slit-film tapes, and the construction of the woven fabric therefrom, mean that there are fewer potential defects which can reduce the efficiency of the weaving process. The polymeric tapes, which are larger than the filaments of yarn typically used, are less susceptible to damage and thus avoid the problem of broken filaments. The wider tapes also allow wider looms to be used and will also require fewer insertions per centimeter (i.e., fewer ends and picks per centimeter), thereby improving the rate of fabric production.

The resulting fabrics woven from polymeric tapes, which tapes are made from drawn polymer films and/or are separately drawn and which have the characteristics set forth above, can have properties which make such fabrics especially useful in the preparation of vehicle airbags. Such fabrics, for example, will generally have a basis weight values ranging from about 40 to about 140 grams per square meter, more preferably from about 60 to about 130 grams per square meter. At such basis weights, these fabrics exhibit strength and tear resistance properties (described hereinafter) which are comparable to those of airbag fabrics which are woven from conventional multifilament yarns but which have basis weights at least 20% greater than those of the fabrics of this invention.

The slit-film tape woven fabrics herein will preferably exhibit a grab tensile strength of at least about 1000 Newtons, for example, from about 1400 to about 2000 Newtons. For purposes of this invention, grab tensile strength is determined by the ASTM D-5034 Grab Tensile Strength test.

The slit-film tape woven fabrics herein will also preferably exhibit a warp tongue tear strength of at least about 200 Newtons, for example, from about 300 to about 500 Newtons. For purposes of this invention, tongue tear strength is determined by the ASTM D-2261 Tongue Tear test.

The slit-film tape woven fabrics herein are especially useful as components of vehicle airbags. For airbag use, such fabrics combine the advantages of using a film substrate, i.e., relatively low weight, stiffness and packing volume, with the advantages of using a yarn-based woven fabric, i.e., relatively high tear strength and high damage tolerance. These slit-film tape woven fabrics can thus be used to form the primary gas-inflated cushion which the airbag provides upon deployment. The fabrics herein can also be used to construct strapping, tethers and/or chutes for airbags. Strapping anchors the airbag to anchor points on the vehicle chassis. Tethers are internal straps holding the inside surfaces of the front and back of the airbag together. Chutes are structures which form passageways that guide airbag deployment upon inflation. (See, for example, U.S. Pat. No. 5,863,063, incorporated herein by reference.)

Given the relatively open structure of the slit film tape woven fabrics herein, resulting from the relatively fewer cross-over and anchoring points between warp and weft, the fabrics herein are advantageously coated with an organic coating agent to reduce the air permeability of the airbag fabric. Such organic coating agents can be any of those materials conventionally employed to coat vehicle airbags. Suitable organic coating agents include, for example, neoprene, chloroprene, polyurethane and silicone.

The airbag fabrics herein can be coated on one or both sides. Since such fabrics are woven from tapes slit from films, the resulting fabrics herein will be relatively flat compared to conventional woven yarn airbag fabrics. This means that it is possible to use a wide range of fabric coating methods, including methods which are not typically employed for the coating of airbag fabrics.

The airbags constructed from the slit-film tape woven fabrics herein will generally comprise at least two separate or distinct pieces of fabric which need to be joined together, e.g., at one or more seams. Again, given the relatively open construction of the slit-film tape woven fabrics herein, some conventional methods of joining fabric pieces, e.g., sewing, may not be suitable. Accordingly, when joining a piece of the fabric herein with another fabric or component for airbag construction, adhesive or thermal bonding of the fabric herein is preferably employed.

Adhesive bonding of airbag fabrics is known in the art and can be carried out with the fabrics herein in conventional manner. Use of adhesive bonded airbag fabrics is disclosed, for example in U.S. Pat. No. 5,782,489 and in PCT Patent Application No. WO 99/14082. Both of these patent documents are incorporated herein by reference. Preferred adhesive materials which can be used to bond the airbag fabrics herein to other fabrics or components in the course of airbag construction include polyether/polyamide block copolymer adhesives, acrylate/epoxy adhesives, acrylate/silicone adhesives, ethylene/acrylic acid adhesives, polyurethane adhesives, polyester adhesives, polyester/epoxy adhesives, polyolefin rubber adhesives, epoxy/polyolefin adhesives, polyamide adhesives, polyurea adhesives and combinations thereof.

Since the airbags made from the fabrics herein will generally be made from fabric pieces which are adhesively or thermally bonded or welded, strength requirements for such airbags will not be driven by the strength of the seams as is the case with airbags made from conventionally woven fabrics with sewn seams. This means that strength requirements for airbags made from the adhesively or thermally bonded or welded fabrics of this invention can be based on the relatively lower grab tensile and tongue tear strength properties of the fabric itself.

EXAMPLE

A fabric suitable for use in airbag construction in accordance with the present invention is prepared as follows:

A roll of nylon 6,6 film is provided for slitting into nylon 6,6 tapes. Such a film is a uniaxially oriented film which has been drawn at a draw ratio of 4 in the machine direction. This film is 380 cm in width and has a gauge of 60 microns after orientation.

This drawn nylon 6,6 film is fed to a slitting apparatus which slits the film in the machine direction into 760 tapes, each of which is approximately 5 mm wide. Such tapes each have a breaking force of approximately 135 Newtons and are wound onto bobbins or onto a beam and bobbins for use as warp and weft tapes in weaving a fabric therefrom.

Using a projectile loom, the warp and weft tapes from the bobbins are woven into a fabric in a plain weave pattern which has a construction of about 17 warp ends per 10 cm and 17 weft picks per 10 cm. The resulting woven fabric has a basis weight of about 110 grams/m$^2$. It exhibits a grab tensile strength of about 1120 Newtons and has a warp tongue tear strength of about 370 Newtons. Such a fabric is suitable for constructing an inflatable nylon airbag for use as a supplementary passenger restraining device in an automobile.

Comparative Example

A fabric similar to that prepared in the Example above, but with tapes slitted from a significantly thinner film, is prepared as follows:

A roll of drawn nylon 6,6 film is provided for slitting into nylon 6,6 tapes. Such a film is a uniaxially oriented film which has been drawn at a draw ratio of 4 in the machine direction. This film is 380 cm in width but has a gauge of only 20 microns after orientation.

This nylon 6,6 film is fed to a slitting apparatus which slits the film in the machine direction into 760 tapes, each of which is approximately 5 mm wide. Such tapes each have a breaking force of approximately 45 Newtons and are wound onto bobbins or onto a beam and bobbins for use as warp and weft tapes in weaving a fabric therefrom.

Using a projectile loom, the warp and weft tapes from the bobbins are woven into a fabric in a plain weave pattern which has a construction of about 17 warp ends per 10 cm and 17 weft picks per 10 cm. The resulting woven fabric has a basis weight of only about 37 grams/m$^2$. It exhibits a grab tensile strength of about 370 Newtons and has a warp tongue tear strength of about 120 Newtons. Such a fabric is not suitable for constructing an inflatable nylon airbag for use as a supplementary passenger restraining device in an automobile. This is because when woven into an airbag which is used with inflation devices employing existing technology for inflating airbags, such a fabric does not exhibit sufficient grab tensile strength or warp tongue tear strength to maintain airbag integrity upon inflation.

What is claimed:

1. A process for preparing a slit film-based woven fabric suitable for use in manufacturing vehicle airbags, said process comprising:
   A) providing a thermoplastic polymeric film having a machine direction and a caliper of from about 80 to about 240 microns;
   B) drawing said film at least in the machine direction using a draw ratio of from about 2 to about 6;
   C) slitting said drawn film in the machine direction to form a plurality of thermoplastic polymer tapes each having a width of from about 3 to about 15 mm and a tensile strength of at least about 200 MPa; and
   D) utilizing said plurality of thermoplastic polymer tapes as both warp and weft tapes to weave a fabric therefrom, said fabric having a basis weight of from about 40 grams/m$^2$ to about 140 grams/m$^2$,
   characterized in that said thermoplastic polymeric film comprises a polyamide film.

2. A process for preparing a slit film-based woven fabric suitable for use in manufacturing vehicle airbags, said process comprising:
   A) providing a thermoplastic polymeric film having a machine direction and a caliper of from about 80 to about 240 microns;
   B) slitting said film to form a plurality of thermoplastic polymer tapes each having a machine direction and a width of from about 3 to about 15 mm;
   C) drawing the tapes in said plurality of tapes in the machine direction to the extent necessary to provide substantially all of the tapes within said plurality of tapes with a tensile strength of at least about 200 MPa; and
   D) utilizing said plurality of thermoplastic polymer tapes as both warp and weft tapes to weave a fabric therefrom, said fabric having a basis weight of from about 40 grams/m$^2$ to about 140 grams/m$^2$,
   characterized in that said thermoplastic polymeric film comprises a polyamide film.

3. A process according to claim 2 wherein said plurality of tapes is slit from said thermoplastic polymer film in the machine direction of said film.

4. A process according to claim 2 wherein the tapes in said plurality of tapes are drawn using a draw ratio of from about 2 to about 6.

5. A process according to claims 1 wherein said warp and weft tapes are woven into a plain weave or a twill weave pattern.

6. A process according to claims 1 wherein said warp and weft tapes have an average width of from about 4 mm to about 10 mm.

7. A process according to claims 1 wherein said warp and weft tapes have a tensile strength of at least about 300 MPa.

8. A process according to claims 1 wherein said thermoplastic polymeric film is a cast or blown film comprising nylon 6 or nylon 6,6 polymeric units.

9. A process according to claim 8 wherein said thermoplastic polymeric film comprises nylon 6 or nylon 6,6 modified with an ethylene copolymer.

10. A process according to claim 9 wherein said nylon-modifying ethylene copolymer is selected from the group consisting of ethylene/vinyl acetate and ethylene/alkyl (meth)acrylate dipolymers and terpolymers.

11. A process according to claims 1 wherein the fabric prepared exhibits a grab tensile strength of at least about 1000 Newtons as determined by ASTM D-5034.

12. A process according to claims 1 wherein the fabric prepared exhibits a warp tongue tear strength of at least about 200 Newtons as determined by ASTM D-2261.

13. A process according to claims 1 which comprises the additional step of coating the formed fabric with an organic coating agent to reduce the air permeability of said fabric.

14. A process according to claim 13 wherein said organic coating agent is selected from the group consisting of neoprene, chloroprene, polyurethane and silicone.

* * * * *